US011953064B2

(12) United States Patent
Battlogg (10) Patent No.: US 11,953,064 B2
(45) Date of Patent: Apr. 9, 2024

(54) MAGNETORHEOLOGICAL BRAKE DEVICE AND METHOD (71) Applicant: INVENTUS ENGINEERING GMBH, St. Anton I.M. (AT)

(72) Inventor: Stefan Battlogg, St. Anton I.M. (AT)

(73) Assignee: INVENTUS Engineering GmbH, St. Anton i.M. (AT)

(*) Notice: Subject to any disclaimer, the term of this patent is extended or adjusted under 35 U.S.C. 154(b) by 917 days.

(21) Appl. No.: 16/961,339

(22) PCT Filed: Jan. 10, 2019

(86) PCT No.: PCT/EP2019/050592
§ 371 (c)(1),
(2) Date: Jul. 10, 2020

(87) PCT Pub. No.: WO2019/138015
PCT Pub. Date: Jul. 18, 2019

(65) Prior Publication Data
US 2020/0355229 A1 Nov. 12, 2020

(30) Foreign Application Priority Data
Jan. 10, 2018 (DE) .............. 102018100390

(51) Int. Cl.
F16D 65/16 (2006.01)
F16D 57/00 (2006.01)
(Continued)

(52) U.S. Cl.
CPC ........... *F16D 57/002* (2013.01); *F16D 65/16* (2013.01); *G10L 15/22* (2013.01); *G10L 25/51* (2013.01);
(Continued)

(58) Field of Classification Search
CPC .. F16D 57/002; F16D 65/16; F16D 2127/008; G10L 15/22; G10L 25/51
See application file for complete search history.

(56) References Cited

U.S. PATENT DOCUMENTS 6,095,486 A 8/2000 Ivers et al.
7,434,824 B2 10/2008 Connors et al.
(Continued)

FOREIGN PATENT DOCUMENTS

CN 1392354 A 1/2003
CN 1688456 A 10/2005
(Continued)

*Primary Examiner* — Vishal R Sahni
(74) *Attorney, Agent, or Firm* — Laurence A. Greenberg; Werner H. Stemer; Ralph E. Locher (57) ABSTRACT A magnetorheological brake device has a stationary holder and two brake components. A first brake component is connected to the holder for conjoint rotation and extends in the axial direction. A second brake component includes a hollow sleeve part which can rotate about the first brake component. A gap is formed between the first and second brake components. At least one, two or more rotatable transmission components are arranged in the gap. The gap is filled with a magnetorheological medium. The first brake component has a core which extends in the axial direction and is made of a magnetically conductive material, and an electrical coil which is wound about the core in the axial direction, such that a magnetic field generated by the electrical coil extends across the first brake component.

18 Claims, 5 Drawing Sheets (51) Int. Cl.
*G10L 15/22* (2006.01)
*G10L 25/51* (2013.01)
*F16D 127/00* (2012.01)

(52) U.S. Cl.
CPC .. *F16D 2127/008* (2013.01); *G10L 2015/223* (2013.01)

(56) References Cited

U.S. PATENT DOCUMENTS

| | | | |
|---|---|---|---|
| 9,091,309 B2 | 7/2015 | Battlogg | |
| 9,482,304 B2 | 11/2016 | Battlogg et al. | |
| 10,054,186 B2 | 8/2018 | Battlogg et al. | |
| 10,671,171 B2 | 6/2020 | Battlogg | |
| 2009/0026033 A1 | 1/2009 | Steinwender et al. | |
| 2013/0175132 A1* | 7/2013 | Battlogg | F16C 33/6688 192/21.5 |
| 2016/0153508 A1* | 6/2016 | Battlogg | A61F 2/38 188/267.2 |
| 2016/0378131 A1* | 12/2016 | Battlogg | F16H 59/0217 74/553 |
| 2017/0045958 A1* | 2/2017 | Battlogg | G06F 1/169 |
| 2018/0298959 A1* | 10/2018 | Battlogg | F16D 57/002 |
| 2018/0319435 A1* | 11/2018 | Bossio | B62D 7/224 |
| 2019/0111300 A1* | 4/2019 | Battlogg | A63B 22/0605 |

FOREIGN PATENT DOCUMENTS

| | | | |
|---|---|---|---|
| CN | 103109103 A | 5/2013 | |
| CN | 203784125 U | 8/2014 | |
| CN | 105179515 A | 12/2015 | |
| CN | 105179516 A | 12/2015 | |
| CN | 206636977 U | 11/2017 | |
| DE | 10055388 A1 | 3/2002 | |
| DE | 102012013480 A1 | 1/2014 | |
| DE | 102012017423 A1 | 3/2014 | |
| DE | 102014217110 A1 | 3/2016 | |
| KR | 1020170075341 A | 7/2017 | |
| WO | 2006128636 A1 | 12/2006 | |
| WO | 2012034697 A1 | 3/2012 | |
| WO | WO-2016156544 A1 * | 10/2016 | F16F 15/10 |
| WO | 2017001696 A1 | 1/2017 | |
| WO | 2017168004 A2 | 10/2017 | |

* cited by examiner

MAGNETORHEOLOGICAL BRAKE DEVICE AND METHOD

BACKGROUND OF THE INVENTION

Field of the Invention

The invention relates to a magnetorheological braking device having a fixed holder and having at least two brake components. The magnetorheological braking device in accordance with the invention may be used in diverse technical fields for braking relative movements with respect to one another. The magnetorheological braking device in accordance with the invention may also be used as a haptic operating device and for example may be used in the operation of technical devices in vehicles, aircraft, airplanes, ships, boats, agricultural technology (tractors, combine harvesters, harvesting machines, other field machines for agriculture), construction machines and machines for material handling (forklift trucks . . . ) or in medicinal or industrial systems. The invention may also be used in the operation or as an input device of/for washing machines, kitchen appliances/household appliances and devices, radios, cameras and film cameras, hi-fi systems and television systems, smart devices, smart home appliances, laptops, PCs, smartwatches, in a crown gear of wristwatches or as a rotary wheel in a computer mouse or other appliances.

Magnetorheological fluids comprise by way of example finest ferromagnetic particles such as by way of example carbonyl iron powder, which are distributed in an oil. Spherical particles having a diameter dependent upon the production procedure of 1 to 10 µm are used in magnetorheological fluids, wherein the particle size and shape is not uniform. If such a magnetorheological fluid is influenced using a magnetic field, the carbonyl iron particles of the magnetorheological fluid concatenate along the magnetic field lines with the result that the rheological characteristics of the magnetorheological fluid (MRF) are considerably influenced in dependence upon the shape and strength of the magnetic field.

WO 2012/034697 A1 discloses a magnetorheological transmission apparatus that comprises two components that may be coupled to one another and it is possible to influence the coupling intensity of said components. A duct is provided with a magnetorheological medium so as to influence the coupling intensity. The magnetorheological medium is influenced in the duct via a magnetic field. Rotary bodies are provided in the duct and regions that are acute-angled and contain the magnetorheological medium are provided on said rotary bodies. The duct or at least a part of said duct may be influenced using the magnetic field of a magnetic field-generating device in order to selectively concatenate the particles and to chock with or to release the rotary body. This magnetorheological transmission apparatus may also be used on a rotary knob for operating technical appliances. Such a magnetorheological transmission apparatus performs and renders possible the transmission of particularly high forces or torques while at the same time being of relatively small construction.

WO 2012/034697 A1 also discloses a rotary knob or an operating knob in which the actual knob is attached in a rotatable manner about a shaft. The braking torque may be controlled via the magnetic field of an electrical coil. If a higher braking torque that may be generated is desired, cylindrical rollers may therefore also be used in lieu of spherical rotary bodies with the result that the magnetic field acts upon a longer stretch or larger surface area. It has been shown in particular in the case of rotary knobs or operating knobs having a relatively small diameter that an extension of the roller body does not necessarily lead to an increase of the maximum braking torque that may be generated. It has been proven that the reason for this is that the magnetic field is closed by means of the central shaft or must go through said central shaft. The small diameter of the shaft limits the braking torque that may be generated since the magnetic field that is required for the braking procedure is rapidly saturated in the (shaft) material. The material that the magnetic field flows through no longer permits a higher magnetic flux which is why a more intense magnetic field also cannot arrive at the rollers. The smallest cross-section that the magnetic field flows through in the entire magnetic circuit defines the maximum possible magnetic flux and therefore the maximum braking torque in the braking apparatus. The use of longer rollers as rotary bodies may then even have a disadvantageous effect on the braking torque that may be generated since the magnetic field is distributed over the longer roller surface area. A lesser field strength is applied. Owing to the fact that the braking effect that may be achieved does not depend in a linear manner upon the magnetic field but rather increases disproportionately in the case of more intense magnetic fields, the braking effect that may be achieved accordingly disproportionately decreases in the case of weaker magnetic fields.

SUMMARY OF THE INVENTION

It is therefore the object of the present invention to provide a magnetorheological braking device, which renders it possible to provide a high braking torque (torque) or a higher braking torque than is the case in the prior art, in particular at small or even up to particularly small diameters.

This object is achieved by virtue of a magnetorheological braking device as claimed. Preferred further developments of the invention are the subject matter of the dependent claims. Further advantages and features of the magnetorheological braking device are apparent in the general description and the description of the exemplary embodiments.

A magnetorheological braking device in accordance with the invention comprises a fixed holder and at least two brake components. A first brake component is connected in a rotatably-fixed manner to the holder and extends in an axial direction. The second brake component comprises a sleeve part that is embodied as hollow and that may rotate about the first brake component. A gap is embodied between the first and the second brake component. At least one, two or more in particular rotatable transmission components are arranged in the gap. The gap is filled at least in part with a magnetorheological medium. In this case, the magnetorheological medium lubricates the transmission components. The first brake component comprises a core that extends in the axial direction, said core being embodied from a magnetically conductive material and (at least) one electrical coil that is wound in the axial direction around the core with the result that a magnetic field of the electrical coil extends transversely through the first brake component.

The first brake component defines an axial direction. However, the first brake component may also be embodied at least in regions at an angle with respect to the axial direction. The phrase "that the core of the first brake component extends in the axial direction" is understood in the sense of the present invention as that the core also extends at least essentially in the axial direction. The core may comprise an orientation that comprises a slight angle with respect to the axial direction. By way of example, the core may also be oriented at an angle of 2.5° or 5° or 10° or 15° with respect to the axial direction. It is also not necessary for the winding of the electrical coil to likewise be oriented exactly in the axial direction about the core. The electrical coil may also be wound around the core at an angle of 5° or 10° or 15° or the like with respect to the axial direction. However, in all cases it is preferred that an angle between the orientation of the core and the axial direction and an angle of the winding of the electrical coil with respect to the axial direction is less than 20° and in particular less than 10°.

The magnetorheological braking device in accordance with the invention has many advantages. One considerable advantage of the magnetorheological braking device in accordance with the invention resides in the fact that the electrical coil is provided on the first brake component. One particular advantage arises by virtue of the fact that the electrical coil is wound about the core at least a significant part of the core, or the entirety of the core, in the axial direction. As a consequence, the magnetic field of the electrical coil extends transverse with respect to the axial direction of the first brake component (in other words radially in relation to the longitudinal axis). This is a considerable difference with respect to the prior art that was disclosed in WO 2012/034697 A1, where the electrical coil is provided on the outer component and wherein the windings of the electrical coil extend concentrically around the axial direction. As a consequence, in the prior art a magnetic field is generated, which extends in the axial direction through the interior of the two components. The inner component, usually a thin wall depending upon the construction, in the case of the prior art consequently limits the magnetic flux cross-section and therefore the maximum entire magnetic flux that is to be achieved. Conversely, the magnetic field extends or the magnetic field lines extend in this case transverse with respect thereto and consequently transversely through the first or inner brake component. An extension of the first brake component in this case increases the possible magnetic flux and therefore the braking torque with the same diameter. The possible core diameter that is usually not constructively larger consequently no longer limits the magnetic flux. The winding(s) of the electrical coil in the case of the present invention preferably lie (at least essentially) in one plane or closely adjacent to the plane, which includes the central axis of the axial direction. In contrast, in WO 2012/034697 A1 the central axis lies perpendicular with respect to the plane of the windings of the electrical coil.

In the case of the magnetorheological braking device, the transmission components are at least in part surrounded by a magnetorheological medium. Overall, it is preferred that a magnetorheological fluid is used as the magnetorheological medium.

It is preferred that multiple in particular rotatable transmission components are arranged distributed over the periphery of the gap. The transmission components may rotate in the gap and rotate relative to one another preferably at least in part during a rotation of the first and second brake component. A central component of the rotatable transmission component or the rotatable transmission component as a whole is in particular dimensionally stable and does not change the outer shape (at least significantly) during a rotation. It is preferred that the rotatable transmission component rotates at least slightly during a rotation of the second brake component relative to the first brake component.

In one preferred development, at least one transmission component is embodied as a roller body. The term "roller body" in the sense of the present invention is understood to mean a rotary body that is suitable for rolling in the gap on the first or the second brake component.

It is preferred that at least one roller body comprises a cylindrical or spherical or round or rounded (essentially dimensionally stable) cross-section. In particular, a roller body may comprise (an elongated) cylindrical section. The roller body may be rounded on the ends or may be embodied to taper to a point or may be angular. Other sections and in particular end sections are also possible. It is particularly preferred that cylindrical rollers are used as roller bodies. A cylindrical roller body has the considerable advantage that the roller body may be effective over the length of the cylindrical section. As a consequence, the effectiveness increases.

One considerable advantage of the present invention resides in the fact that a more intense braking torque may be generated by means of an extension of a by way of example cylindrical roller body. At the same time as the extension of the roller body, the electrical coil may also be extended (in an expedient manner) and said electrical coil extends in the longitudinal direction of the first brake component. A larger penetration surface area (cross-sectional surface area that the magnetic field flows through) is provided for the magnetic field in the case of an electrical coil that is embodied as longer in the axial direction. In the case of the present invention, an extension of the first brake component in the axial direction therefore also enlarges the cross-section of the core. As a consequence, it is possible to achieve a more intense braking torque by means of an extension of the first brake component in the axial direction.

In preferred embodiments, at least some of the transmission components are embodied from a magnetically conductive material. In particular, at least some of the transmission components are embodied from a magnetically non-conductive material. If transmission components are used that are embodied from a magnetically conductive material and simultaneously transmission components are also used that are embodied from a magnetically non-conductive material, the magnetic field therefore concentrates itself in the region of the magnetically conductive transmission component. This leads to the concentration of the magnetic field and to in regions an intensification (magnetic field line concentration). Since the relationship between the braking torque that may be generated and the intensity of the magnetic field is not linear and since the braking torque that may be generated becomes disproportionately more intense as the magnetic field becomes more intense, it is possible as a consequence to achieve a considerable intensification of the braking torque that may be generated (in the case of the same installation space/dimensions).

In all embodiments, it is not necessary to increase the diameter of the first brake component for an increase of the braking torque that may be generated. This is therefore particularly important because many possibilities for use do not allow a larger outer diameter of a braking device or a larger outer diameter would be a significant competitive disadvantage (for example an excessively large side adjusting wheel in the case of a watch). In order to intensify/increase the braking torque, the first brake component may be embodied as axially longer, which is not a disadvantage or is a small disadvantage in terms of installation space required.

In all embodiments, it is preferred that the sleeve part is embodied on a rotary knob. It is preferred that the sleeve part may be formed as a single part with the rotary knob. In the case of such embodiments, it is preferred that the rotary knob or the sleeve part is embodied in the shape of a "pot". The "lid" of the sleeve part may be connected to said sleeve part as a single part or may be fastened separately to said sleeve part.

It is preferred that the sleeve part is embodied from a magnetically conductive material and provides an outer ring for the magnetic field. In order to generate a braking torque, the magnetic field penetrates transversely with respect to the axial direction through the first brake component and penetrates the gap at the roller bodies that are embodied as magnetically conductive. The magnetic field exits the roller bodies into the outer ring or into the sleeve part. In the sleeve part, the magnetic field lines extend back to the other side of the first brake component and penetrate (on the opposite side) the gap again at the roller bodies prior to the magnetic field lines again entering into the first brake component. A closed magnetic circuit or closed magnetic field lines is/are consequently provided.

A chocking effect forms on the roller bodies under the influence of a magnetic field in the case of a relative rotation of the first and the second brake component relative to one another, as is described in WO 2012/034697 A1. The disclosure of this publication is incorporated by reference entirely into this application. The braking torque in the case of the present invention is likewise generated by means of the chocking effect on the transmission component or roller bodies or rotary bodies.

It is preferred that at least one radial wall thickness of the sleeve part is at least half as thick as a gap width of the gap and/or a diameter of a transmission component. It is preferred that a radial wall thickness of the sleeve part is greater than ¾ of the gap width of the gap and/or of a diameter of a transmission component. The radial wall thickness of the sleeve part may also in particular be greater than a diameter of a transmission component. It is possible by means of a sufficient wall thickness of the sleeve part that is embodied from a magnetically conductive material to ensure that the desired field strength of the magnetic field may be generated in the region of the roller body in order to be able to generate a high braking torque.

In all embodiments, it is preferred that a length of the first brake component in the axial direction is greater than a length of a transmission component in the axial direction. If the transmission component in the axial direction is embodied as shorter than the first brake component, this leads to a three-dimensional concentration of the magnetic field in the edge region of the transmission component or of the roller body. The magnetic field may practically only penetrate the gap in the sections in which a transmission component or a roller body is located.

It is preferred that a length of the gap in the axial direction is at least twice as large as a length of a transmission component in the axial direction. It is also possible and preferred that two or more transmission components and in particular roller bodies are arranged in the axial direction one behind the other. In this case, it is possible for example that magnetically conductive transmission components and magnetically non-conductive transmission components alternate in the axial direction with the result that by way of example each second or third transmission component in the axial direction is embodied in a magnetically non-conductive manner. As a consequence, a concentration of the magnetic field is produced that is advantageous for the maximum braking torque that may be generated.

It is preferred that the first brake component is embodied in an essentially cylindrical manner and comprises a cylindrical base body as a core and the electrical coil or the electrical coils. It is also possible that by way of example a sphere for mounting the rotary knob is included and said sphere may be arranged centrally on the distal end in order to provide a simple bearing arrangement between the first brake component and the second brake component.

It is preferred that the electrical coil is wound in axial grooves and transverse grooves of the cylindrical base body (of the first brake component). It is preferred that the axial grooves and the transverse grooves are filled at least in part with casting compound. As a consequence, magnetorheological medium or magnetorheological fluid is prevented from penetrating into the region of the coil wires. This could otherwise lead to a separation of the fluid.

In preferred embodiments, it is possible that the cylindrical base body (of the first brake component) is surrounded by a sleeve body that is fixedly connected to the cylindrical base body. In this case, a radial thickness of the sleeve body is preferably considerably smaller than half of the radial gap width of the gap. It is particularly preferred that the radial thickness of the sleeve body is smaller than ¼ of the radial gap width of the gap. It is particularly preferred that a radial thickness of the sleeve body is less than ⅙, ⅛ or ⅒ of a diameter of a roller body. In particularly preferred embodiments, the sleeve body is embodied from a magnetically conductive material. The sleeve body provides a protective sleeve. As a consequence, an abrasion of the casting compound as the rotary body is rotating is reliably prevented. Fundamentally namely no or only an extremely small amount of magnetic field penetrates the gap in the region of the casting compound with the result that in the region of the casting compound no significant forces act upon the roller body and consequently the casting compound. Nevertheless, in the case of continuous operation, a wear may occur that is reliably avoided by means of a thin sleeve body. A thin sleeve body reduces the magnetic loss since only a small part of the magnetic field is short circuited via the sleeve body.

It is preferred that the holder comprises a cable bushing. Connecting cables for the coil and/or sensor cable and the like may be further guided by means of the holder or by means of the cable bushing of the holder. As a consequence, a simple assembly procedure and cost-effective production are rendered possible.

It is preferred that the holder comprises a receiving arrangement for the rotatably-fixed connection to the first brake component. In this case, the holder may receive the first brake component in a non-positive-locking manner and/or positive-locking manner. During operation, the braking torque between the first brake component and the second brake component is transmitted via the holder.

It is preferred that the holder comprises a cylindrical running surface for a bearing arrangement and supports the sleeve part in a rotatable manner on the holder.

It is preferred that a seal is arranged on the cylindrical running surface, wherein the seal is arranged in particular closer to the gap than the bearing arrangement. As a consequence, the bearing arrangement is reliably protected from the magnetorheological medium. Such an embodiment renders possible a compact construction and a reliable operation. The bearing arrangement may be for example a slide bearing or a roller bearing.

It is preferred that the cylindrical running surface is hardened and/or comprises a higher surface quality than the radial outer surface of the receiving arrangement. As a consequence, it is possible to reduce production costs.

In advantageous embodiments, the cylindrical running surface comprises an outer diameter that is at least 3 mm smaller than an outer diameter of the receiving arrangement of the holder.

In preferred embodiments, the first brake component comprises a feed-through for a shaft that is connected in a rotatably-fixed manner to the second brake component. In particular, the feed-through is embodied centrally on the first brake component. Such an embodiment renders it possible for example to attach a part of an angle sensor (for example a rotary encoder) to the shaft. This part of the angle sensor is then received in a manner in which it is protected against the outer environment. The angle sensor may still be arranged by way of example within the magnetorheological braking device for example within the holder. It is also possible that the shaft extends into the console on which the magnetorheological braking device is fastened. It is then possible for a part of an angle sensor to be received within the console in a protected manner.

It is preferred that the holder is fastened to a console. A further part of an angle sensor is preferably fastened to the holder or the console. By way of example, a magnetic encoder may be fastened to the shaft and a detector may be fastened to the holder or the console with the result that corresponding rotary signals may be detected in the case of a rotational movement of the shaft. In this case, it is possible to detect a relative positioning arrangement or also an absolute positioning arrangement. It is preferred that the rotary encoder generates more than 10 000 pulses (increments) per rotation, particularly preferably more than 30 000 pulses (increments) per rotation.

It is preferred that a user interface, an operator panel, a display, a touch-sensitive display with or without haptic feedback and/or at least one sensor is attached to the axial end that lies opposite the holder. Such an embodiment renders it possible in addition to the operation to also simultaneously display or output information during the operation. By way of example, an operating knob having a simultaneous output display is rendered possible.

In all embodiments, it is possible that a pressure sensitive sensor is attached to the holder or such a sensor is allocated to the holder. By way of example, a pressure-sensitive sensor may be attached in the holder. It is however also possible that a piezo sensor is attached to the lower part etc. The holder may also be embodied in a two-part manner and may register an axial displacement of the two parts relative to one another. In this case, a haptic feedback may be provided.

In all embodiments, it is preferred that a difference between an inner diameter of the sleeve part and an outer diameter of the first brake component is greater than 3 mm and less than 50 mm. It is likewise preferred that an outer diameter of the sleeve part is between 15 mm or 20 mm and 90 mm. It is preferred that a height of the sleeve part is between 10 mm and 60 mm. In all embodiments, it is preferred that a control device is included, which is embodied to provide a variable braking effect using the electrical coil.

Overall, the present invention operates in a particularly preferred manner according to the basic principle of providing a chocking arrangement, wherein a transmission component and in particular a roller body or a rotary body rolls on said transmission component at a specific distance with respect to the walls. The chocking effect is provided by means of a magnetic field with the result that a high braking torque may be generated. In contrast to the previous prior art, where a coil that is wound radially around the axis of a brake component generates a magnetic field in the axial direction of the brake component, in accordance with the present invention a magnetic field is generated transverse to (the core) of the first brake component. It is possible to achieve an improved scalability by means of using this axial coil. As a consequence, it is possible by means of longer roller bodies and an axially longer electrical coil to generate a scalable and greater braking torque. In this case it is not necessary for the diameter of the first brake component to be selected as larger in order to conduct a corresponding magnetic field since the surface area of the core (cross-sectional surface area) enlarges with an axial extension of the core. Where applicable, the axial length may also be reduced if only a relatively small braking torque is required. The installation space may be adapted accordingly.

A further advantage is that the leading-out of the electrical connecting cable for the electrical coil is possible in a simple manner even for large-scale production. Sealing of the magnetorheological braking device and scaling can be made possible by simple means.

Fundamentally, it is possible for the magnetorheological braking device to generate a greater torque over longer roller bodies since the operative length increases. Simultaneously, it is ensured by means of the larger core surface that the roller bodies are always exposed to a corresponding magnetic flux density. The magnetic field strength when "chocking" on the roller bodies may be selected as higher than in the prior art. Long roller bodies may be used which a sufficiently intense magnetic field may be guided to.

In particular, the magnetic field that is generated by the electrical coil passes radially through the core then through the roller bodies and closes itself via the sleeve part or the outer cylinder. In this case, the magnetic field lines connect once in the one, and for example, lower half and once in the other, and for example, upper half of the sleeve part. In simple embodiments, the magnetic flux consequently runs in an essentially two-dimensional manner. In this case, it does not matter how long or how tall the roller bodies are embodied. As a consequence, it is possible to achieve an arbitrary scaling in the length since the magnetic field transmitting surface area enlarges accordingly. In the case of electrical coils that are wound concentrically around the longitudinal direction of the first brake component (prior art), the cross-sectional surface area in the core conversely always remains the same and in this respect forms a bottleneck for the magnetic field as long as the diameter is not changed. A larger diameter of the first brake component however also changes the requirements for installation space, the installation dimensions and the weight of the magnetorheological braking device. Moreover, the torque intervals and the rotational speeds of the roller bodies change, which is not always advantageous. In the case of a linear extension as is the case in the present invention, this conversely does not change.

If longer roller bodies are used, the braking effect of a long roller may be better than in the case of two short rollers that comprise the same overall length. This is due inter alia to the fact that more of the fluid in terms of distance must be displaced since the edge is further away (hydrodynamic pressure).

In preferred embodiments, the magnetorheological braking device comprises a diameter of the sleeve part of between approximately 10 and 40 mm (+/−20%) in preferred embodiments approximately 25 mm.

In all embodiments, it is possible that the electrical coil is embodied as longer in the axial direction than the roller bodies. As a consequence, a concentration of the magnetic field on the roller bodies is achieved.

Overall, the invention provides an advantageous magnetorheological braking device ("MRF brake"). In this case, the outer diameter of the MRF brake is usually predetermined particularly in the case of haptic applications. In this case, there are ergonomic guidelines. It is therefore generally not easily possible to enlarge the core cross-section because the outer diameter therefore also increases (knob outer diameter; surface area for fingers). Moreover, more braking torque is required with an increasing outer diameter since the torque intervals therefore enlarge (the finger force, in other words the (tangential) force between the actuating finger(s) and the brake element or the outer surface area of the brake element must or should remain identical since on the one hand only a specific force may be applied by the user and the necessary forces are important at the fingers (fingertips) for physical comfort during the actuating procedure (operating quality).

The electrical coil in the case of the solution in accordance with the invention extends axially (in contrast to the prior art). The magnetic field that is generated by the coil passes radially through the core, then through the roller body and closes itself via the outer cylinder (respectively through the opposing halves). This always remains the same regardless of how tall (or long) the roller bodies or MRF brake is.

It is advantageous that the MRF brake or the haptic knob may be scaled arbitrarily in length since the magnetic field transmitting surface enlarges accordingly. In the case of radial electrical coils, the cross-sectional surface area in the core always remains the same and may form a bottleneck for the magnetic field as long as the diameter is not changed. If the diameter is changed, many aspects change accordingly (torque intervals, rotational speeds of the rollers . . . ), which is not always advantageous. In the case of a linear extension of the MRF brake in accordance with the invention, this does not change.

The invention achieves the aim of obtaining an MRF brake that is as simple as possible however nevertheless effectively scalable, said MRF brake having a high braking torque while having a compact outer diameter.

The axial electrical coil that is wound and cast (in the axial direction) around the core generates a magnetic field. This magnetic field closes itself via the roller bodies and the sleeve part that forms an outer cylinder as described above. It is advantageous to cast the electrical coil so that the MR fluid (carrier fluid) does not reach into the empty spaces between the coil wires (capillary effect). Otherwise this may lead to separation occurring. In lieu of a (cylindrical) coil wire, it is also possible to use a flat material of copper or another suitable material.

The core, the roller bodies and the outer cylinder may be produced from a simple steel (for example 5235) without high demands on the surface quality and hardness, said simple steel preferably having good magnetic properties. However, it is also possible to use (multiple stacked one above the other) roller bodies or spheres or transmission components of some other shape. Spacers (guide plates) may be provided between the roller bodies.

It is not absolutely necessary for the space (gap) between the core and outer cylinder to be (almost) completely filled with roller bodies. Spacers that are embodied from a magnetically non-conductive material—together with roller bodies that are embodied from a magnetically conductive material—may also be used between the roller bodies or one or multiple roller bodies.

The core together with the electrical coil and casting compound are preferably centered and fixed in a "holder" (non-positive-locking or positive-locking connection) and the counter torque is transmitted via this holder to the console (base plate; receiving plate; housing). The holder preferably has a hole through which the cables are guided. It is preferred that a sealing element (for example an O-ring) seals the cable with respect to the holder or the interior with the result that fluid cannot escape from the interior outwards via the cable. In addition to the (coils) cable, it is also possible for a temperature sensor cable or another sensor cable to be guided through this opening. The cylindrical surface of the tapered holder is preferably provided in such a manner that said surface has running surface characteristics (coated or hardened or similarly annealed with a higher surface hardness and low surface roughness).

The holder may also be produced from a material different to that of the core, roller body or outer cylinder. The diameter reduction of the holder on the running surface has the advantage that the frictional radius for the sealing element is reduced which reduces the entire friction. Moreover, a bearing element may be used owing to the increased installation height as a result, said bearing element comprising the same bearing outer diameter as the inner diameter of the sleeve part. This reduces the production costs of the sleeve part, since it is not necessary to provide a recess during the production process. The preferred roller body height is between 3 and 6 mm, however it may also be 1 or 2 mm. In this field, it is difficult to obtain good bearing or sealing elements if the inner diameter of the holder does not provide additional installation height.

It is possible to attach a decorative or other transmission element above the outer cylinder, for example a rubberized knob.

When viewed axially from above, a sphere or a spherical or a spherically similar component (may also be a hemisphere) is preferably between the outer cylinder and the casting compound. This guides the two parts relative to one another.

It is preferred that the sphere is fixed in the casting compound and the inner axial end face of the outer cylinder rotates relative to said sphere. A simple, low friction and cost effective bearing arrangement (bearing position) is therefore provided. A conical shape or the like is also possible. In lieu of this type of bearing arrangement, it is also possible however to select any other type of bearing arrangement (for example a slide bearing or roller bearing).

There is a space between the roller lower part and the seal. This space is used in particular as a reservoir and also as a temperature compensating space. A temperature compensating element (for example an O-ring filled with air) may also be accommodated in this space. A closable filling opening or venting opening may likewise be provided in this region in the sleeve part (or the outer cylinder).

It is preferred that at least one component, which the magnetic field flows through, is embodied at least in part or entirely from the material FeSi3P.

It is preferred that at least one microphone and or a sound recognition device and/or a voice recognition device is included or allocated. A computer device may also be included. Sounds and/or voice commands may be evaluated locally and/or remotely. By way of example, a computer unit (processor) may be provided locally. The processing may also be performed in a remote network and only the result—in other words the command that is to be performed—may be returned.

The invention also relates to a method for operating appliances using an (adaptive) braking device having a rotatable brake component for manual rotation. In this case, the braking device is controlled in dependence upon the manual rotation of the rotatable brake component and at least also by means of at least one command that is identified by means of sound recognition.

It is preferred that various voice commands and/or sound signals and/or clapping signals may be identified and differentiated using the sound recognition. The number of different and differentiable commands may be limited, however it is not essential that they are limited.

It is possible and preferred that sounds are received and are processed locally and/or remotely.

At least one magnetorheological braking device is preferably controlled as described above.

A voice-controlled input may be used for the control procedure. It is possible and preferred in all cases that an adaptive braking device or adaptive haptic operating device is used with a braking device. The adaptivity may depend upon the operating mode that is selected by sound or for example voice command.

Further advantages and features of the present invention are apparent in the exemplary embodiments, which are explained below with reference to the attached figures.

DETAILED DESCRIPTION OF THE INVENTION

Figure 1:
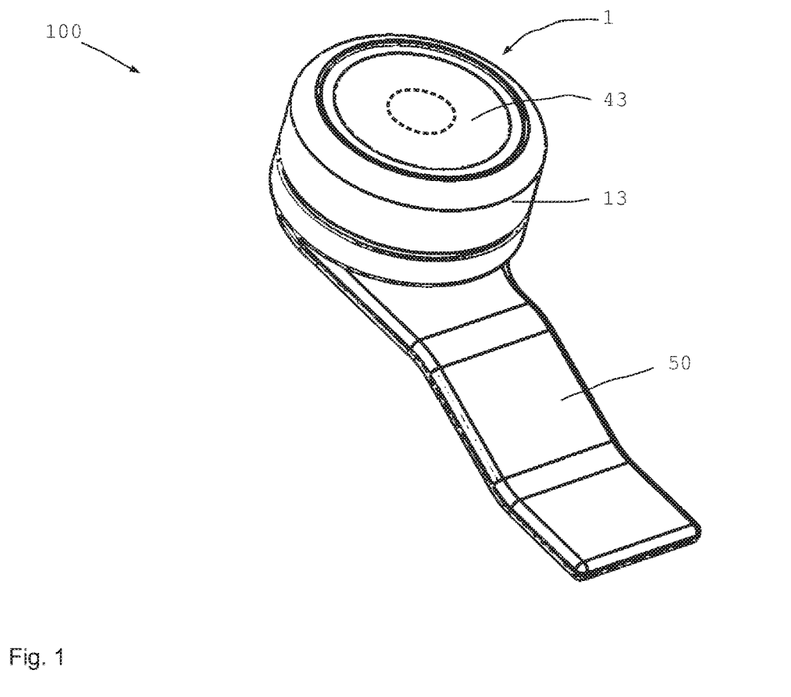
FIG. 1 illustrates a simplified schematic three-dimensional view of a magnetorheological braking device in accordance with the invention.

FIG. 1 illustrates a schematic perspective view of a magnetorheological braking device 1 that is embodied in this case as a haptic operating knob 100 and is fastened to a console 50 or comprises such a console 50. The magnetorheological braking device 1 comprises a sleeve part 13 that is received in a rotatable manner. It is possible to adjust the torque that is required in order to rotate the sleeve part 13.

A user interface 43 is arranged on the upper side of the magnetorheological braking device 1. Such a user interface 43 may be embodied by way of example as a display device or also as a touch sensitive input possibility (touchpad, movement control and gesture control, image recognition . . . ).

The haptic operating knob 100 may be used by way of example so as to operate machines, medical appliances or for use in and for the motor vehicle. It is also possible to use said haptic operating knob on other appliances or other apparatuses.

Figure 2:
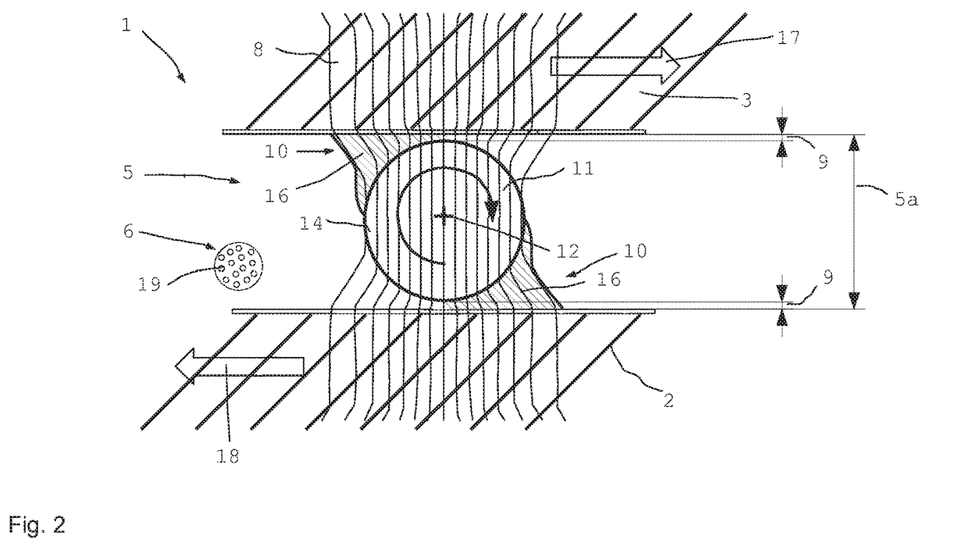
FIG. 2 illustrates a simplified schematic cross section through a roller body of a magnetorheological braking device.

FIG. 2 illustrates a simplified schematic cross-sectional view of a magnetorheological braking device 1 in accordance with the invention for influencing the transmission of force between two brake components 2 and 3. In this case, a roller body or rotary body 11 is provided between the two brake components 2 and 3 in FIG. 2. The roller body 11 is embodied in this case as a sphere 14. However, it is likewise possible to embody the roller bodies 11 as cylinders or ellipsoids, rollers or other rotatable rotary bodies. It is also possible to use as roller bodies rotary bodies that are not rotationally symmetrical in the proper sense of the word such as by way of example a gear wheel or rotary body 11 having a specific surface structure. The roller bodies 11 are not used for the bearing arrangement with respect to one another but rather for transmitting torque.

A duct 5 is provided between the brake components 2 and 3, said duct in this case being filled with a medium 6. The medium in this case is a magnetorheological fluid, which comprises by way of example an oil as a carrier fluid in which ferromagnetic particles 19 are provided. Glycol, fat, water and viscous materials may also be used as a carrier medium without being limited to any material. The carrier medium may also be gaseous or the carrier medium may be omitted (vacuum). In this case, only particles that may be influenced by means of the magnetic field may be filled in the duct.

The ferromagnetic particles 19 are preferably carbonyl iron powder, wherein the size distribution of the particles depends upon the specific application case. Specifically, a distribution of the particle size between one and ten micrometers is preferred, wherein however larger particles of twenty, thirty, forty and fifty micrometers are also possible. Depending upon the application case, the particle size may also be clearly larger and even advance into the millimeter range (particle spheres). The particles may also comprise a specific coating/jacket (titanium coating, ceramic jacket, carbon jacket etc.) so that said particles may better withstand the high-pressure loads that occur depending upon the application case. The magnetorheological particles may be produced not only from carbonyl iron powder (pure iron) for this application case but rather for example may also be produced from special iron (harder steel).

The roller body 11 is preferably set into rotation about its rotary axis 12 by means of the relative movement 17 of the two brake components 2 and 3 and runs practically on the surface of the brake component 3. The roller body 11 simultaneously runs on the surface of the other brake component 2 with the result that a relative speed 18 is provided at that location.

In fact, the roller body 11 does not have direct contact with the surface of the brake components 2 and/or 3 and therefore does not roll directly on said brake component. The free gap 9 from the roller body 11 to one of the surfaces of the brake components 2 or 3 is for example 140 μm. In one specific embodiment having particle sizes between 1 μm and 10 µm, the free gap is in particular between 75 µm and 300 µm and particularly preferably between 100 µm and 200 µm.

The free gap 9 is in particular at least ten times the diameter of a typical average particle diameter. The free gap 9 is preferably at least ten times a largest typical particle. As a result of the lack of direct contact, there is a particularly low level of basic friction/force/torque during the relative movements of the brake components 2 and 3 with respect to one another.

If the magnetorheological braking device 1 is influenced using a magnetic field, the field lines form in dependence upon the distance between the roller bodies 11 and the brake components 2, 3. The roller body 11 is embodied from a ferromagnetic material and for example in this case from ST 37 (S2305). The steel type ST 37 has a magnetic permeability µr of approximately 2000. The field lines (magnetic circuit) pass through the roller body and concentrate themselves in the roller body. A high magnetic flux density prevails on the roller body on the in this case radial entering surface area and exiting surface area of the field lines in the duct 5. The inhomogeneous and strong field in said duct leads to a local and intense linkage of the magnetic polarizable particles 19 (magnetic concatenation). The effect is intensely increased by means of the rotational movement of the roller body 11 in the direction of the chock that forms in the magnetorheological fluid and the possible braking torque or coupling torque is extremely increased far beyond the amount that may normally be generated in the magnetorheological fluid. It is preferred that the roller body 11 and brake components 2, 3 are embodied at least in part from ferromagnetic material, which is why the magnetic flux density is higher the smaller the distance between the rotary body 11 and brake components 2, 3. As a consequence, an essentially chock shaped region 16 forms in the medium in which the gradient of the magnetic field increases intensely toward the acute angle at the contact site or the region of the smallest gap.

Despite the gap between the roller body 11 and the brake components 2, 3, it is possible by means of the relative speed of the surfaces with respect to one another to set the roller bodies 11 into a rotational motion. The rotational motion is possible without and also with an active magnetic field 8.

If the magnetorheological braking device 1 is exposed to a magnetic field 8 of an electrical coil 26 that is not illustrated in this case in FIG. 2, the individual particles 19 of the magnetorheological fluid 6 concatenate along the field lines of the magnetic field 8. It is to be noted that the vectors that are marked in FIG. 2 only approximately schematically represent the region of the field lines that is relevant for influencing the MRF. The field lines enter essentially perpendicular on the surfaces of the ferromagnetic components into the duct 5 and must in particular not extend in a straight line in the acute-angled range 10.

Simultaneously, some material is set in rotation on the periphery of the roller body 11 by the magnetorheological fluid with the result that an acute-angled region 10 forms between the brake component 3 and the roller body 11. An identical acute-angled region 10 forms on the other side between the roller body 11 and the brake component 2. The acute-angled regions 10 may comprise by way of example a chock shape 16 in the case of roller bodies 11 that are embodied in a cylindrical manner. The further rotation of the roller body 11 is prevented as a result of the chock shape 16 with the result that the effect of the magnetic field on the magnetorheological fluid is intensified since the medium 6 is held together more intensely in the acute-angled region 10 by means of the magnetic field that is acting within said acute-angled region. As a consequence, the effect of the magnetorheological fluid intensifies in the accumulated cluster (the concatenation in the fluid and therefore the cohesion or the viscosity), which impedes the further rotation or movement of the rotary body 11.

It is possible by means of the chock shape 16 to transmit significantly greater forces or torques than would be possible with a comparable construction that only uses the shearing motion without the chocking effect.

The forces that may be transmitted directly by means of the magnetic field that is applied only represent a small part of the forces that may be transmitted by means of the apparatus. It is possible by means of the magnetic field to control the formation of the chock and consequently the mechanical force reinforcement. The mechanical reinforcement of the magnetorheological effect may go so far as that a transmission of force may also be possible after disconnecting an applied magnetic field if the particles have been chocked.

It has been proved that a considerably greater effect of a magnetic field 8 of a specific intensity is achieved by means of the chocking effect of the acute-angled regions 10. In this case, it is possible to intensify the effect many times over. In one specific case, an approximately ten times as strong an influence of the relative speed of two brake components 2 and 3 with respect to one another than in the case of the prior art is observed in the case of MRF couplings according to the shear principle in which a magnetorheological fluid is arranged between two surface areas that are moving with respect to one another and said magnetorheological fluid is exposed to the shearing forces of the surface areas that are moving with respect to one another. The possible reinforcement in this case by means of the chocking effect depends upon different factors. Where applicable, said reinforcement may be further intensified by means of a greater surface roughness of the roller bodies 11. It is also possible that outwardly protruding projections are provided on the outer surface of the roller bodies 11 and said projections may lead to an even stronger chock formation.

The chocking effect is distributed in a planar manner on the roller body 11 and the components 2 or 3.

Figure 3:
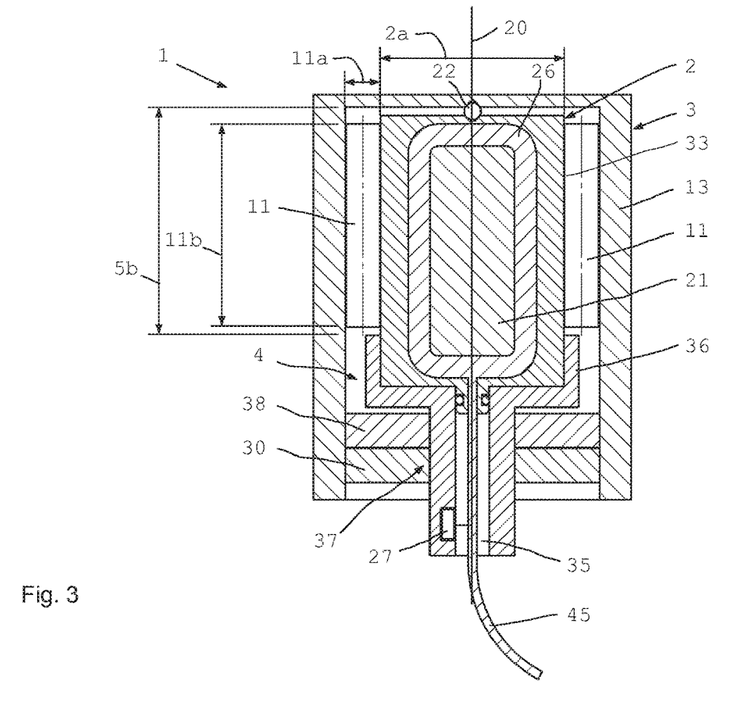
FIG. 3 illustrates a schematic cross section through a magnetorheological braking device in accordance with the invention.

FIG. 3 illustrates a vertical section through a magnetorheological braking device 1 that comprises two brake components 2 and 3. The first brake component 2 is arranged in this case in the interior of the second brake component 3 and is held in a positive-locking and/or non-positive-locking manner by means of a holder 4. The holder 4 may be fastened by way of example on an external console. The holder 4 is regularly fastened in a rotatably-fixed manner. The second brake component 3 is received on the first brake component 2 and may rotate relative to said first brake component.

The second brake component 3 is embodied as star-shaped and comprises the sleeve part 13 and a cover that closes the top of the sleeve part 13. The second brake component 3 is therefore only accessible from the in this case lower end through which the first brake component 2 is guided using the holder 4. A cylindrical running surface 37 is embodied on the holder 4 in the region of the lower end of the first brake component 2. A hardened surface or a surface with corresponding qualities is provided in said region. A bearing arrangement 30 for the rotatable bearing arrangement of the second brake component 3 is attached to this cylindrical running surface 37. A seal 38 is provided in the axial direction 20 further inwards adjacent to the bearing arrangement 30. The seal 38 reliably seals the interior. By virtue of the fact that only one seal 38 is provided on the outside, a low basic torque is required in order to rotate the second brake component 3 in the case of a disconnected magnetic field.

The first brake component 2 comprises a cylindrical base body 33 that comprises axial grooves 31 and transverse grooves 32 (cf. FIG. 7 and FIG. 4) the windings of the electrical coil 26 are wound into the axial grooves 31 and transverse grooves 32 with the result that the individual windings of the electrical coil 26 do not protrude outwards from the cylindrical base body 33. In this case in the exemplary embodiment, the axial grooves 31 and the transverse grooves 32 are subsequently backfilled by means of a casting compound with the result that overall a cylindrical body of the first brake component 2 is provided.

A sphere 22 (or hemi-sphere) is arranged or in part molded centrally on the upper end of the first brake component 2 in order to provide a second bearing arrangement between the first brake component 2 and the second brake components 3 in a simple manner.

A gap 5 is embodied radially between the outer wall of the first brake component 2 and the inner wall of the sleeve part 13, said gap being embodied in this case essentially as a hollow cylindrical gap. Multiple transmission components 11 are arranged in the gap, said transmission components in this case being embodied as roller bodies. The roller bodies 11 are embodied in this case as cylindrical roller bodies and comprise an outer diameter that is slightly smaller than the gap width of the gap 5. The gap 5 is furthermore in this case filled with a magnetorheological medium. It is possible to arrange by way of example an O-ring or the like that is filled with air or another gas in the lower region of the gap, said O-ring providing a volume compensation in the event of temperature fluctuations. Moreover, as a consequence a reservoir is formed in the lower region of the gap for use in case during operation magnetorheological fluid or medium escapes from the interior to the outside.

The (usable) gap length 5b of the gap 5 is greater here than the length 11 b of the roller bodies 11. The electrical coil in this case is also embodied as longer in the axial direction 20 than the length 11b of the roller bodies 11.

The core 21 is apparent in the interior of the electrical coil 26. The holder 4 comprises a radially enlarged receiving arrangement 36 for receiving the first brake component 2 in a rotatably-fixed manner. Through the holder 4, a cable feed-through extends downwards through the holder 4. Cables 45 are guided at this location so as to connect to the electrical coil 26 and where applicable sensor lines. A control device 27 may be provided in the base of the holder 4 or at other suitable positions in order to provide control as required.

Figure 4:
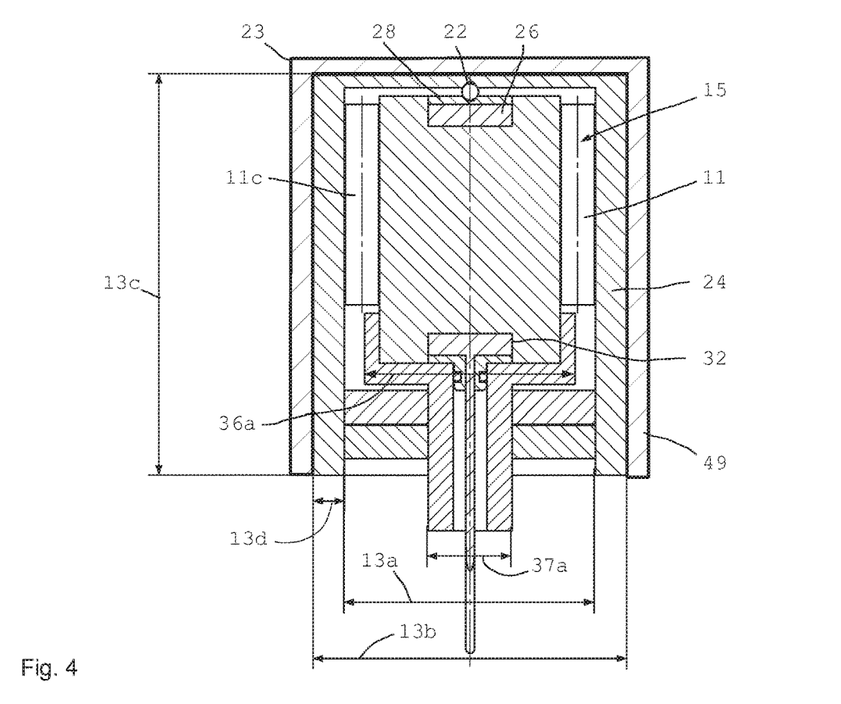
FIG. 4 illustrates a cross section rotated by 90° of the magnetorheological braking device according to FIG. 3.

FIG. 4 illustrates a section offset by 90° through the magnetorheological braking device 1 in accordance with FIG. 3, wherein in this case the transverse grooves 32 are apparent in which the electrical coil 26 is wound. Casting compound 28 is provided in the axial direction on both ends respectively. A separate seal is provided in the region of the cable feed-through 35 via by way of example the marked O-ring or the like.

It is also possible that individual roller bodies of the roller bodies that are arranged distributed over the periphery may be embodied as magnetically non-conductive transmission components 11c. However, it is also possible that all the roller bodies are embodied from a magnetically conductive material. If individual roller bodies are embodied from a magnetically non-conductive material, this therefore leads to a concentration of the magnetic field on the magnetically conductive roller bodies, as a result of which it is possible to generate a stronger braking torque.

A length or height 13c of the sleeve part 13 or the second brake component 3 in the axial direction 20 is preferably between 10 mm and 60 mm. A cover 49 may be attached on the outside to the second brake component 3 with the result that the outer appearance of the rotary knob 23 is essentially determined by means of the surface of the cover 49.

The material of the sleeve part 13 is magnetically conductive and is used so as to close the magnetic circuit. A wall thickness 13d of the sleeve part 13 is preferably at least half as large as a diameter 11a of the roller bodies 11.

The diameter 36a of the receiving arrangement 36 is preferably considerably larger than the diameter 37a of the cylindrical running surface 37. As a consequence, the friction on the seal 38 is reduced. Moreover, it is possible to use standardized bearings.

It is also possible to embody the core 21 as two parts. The division preferably extends along the center line that is marked in FIG. 4, as a result of which a left-hand side and a right-hand side (core) half is provided. The two core halves may be spaced from one another by means of a magnetically non-conductive element (for example seal). It is preferred that the casting compound volume 28 is then a part of the core half (halves) as a result of which a semicircular element having a circumferential groove is provided on the dividing surface for the electrical coil. Further preferably, the receiving arrangement 36 is also divided into two halves. One receiving half may also form one part with a core half (may be embodied as a single part) or a core half may be embodied with a complete receiving unit 36 as a single part.

Figure 5:
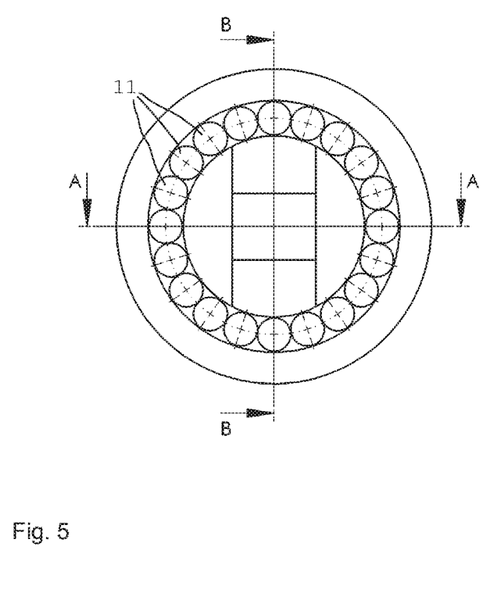
FIG. 5 illustrates a plan view of the magnetorheological braking device according to FIGS. 3 and 4.

FIG. 5 illustrates a plan view of the magnetorheological braking device 1, wherein the roller bodies 11 are apparent. The cylindrical base body having the electrical coil 26 is apparent in the central region.

Figure 6:
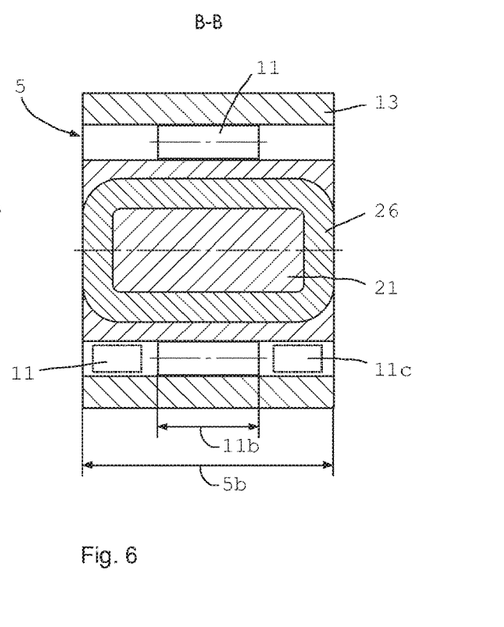
FIG. 6 illustrates the section B-B in FIG. 5.

FIG. 6 illustrates the section B-B in accordance with FIG. 5. The roller bodies 11 are arranged in the gap 5, said roller bodies in this case comprising a (relatively short) length 11b that is considerably shorter than the gap length 5b. As illustrated in the lower part of FIG. 6, multiple roller bodies may be provided axially one behind the other and some of said roller bodies are also magnetically non-conductive, as the roller body 11c marked with the dotted line illustrates. The core 21 is apparent in the central region, said core being surrounded by the coil 26.

Figure 7:
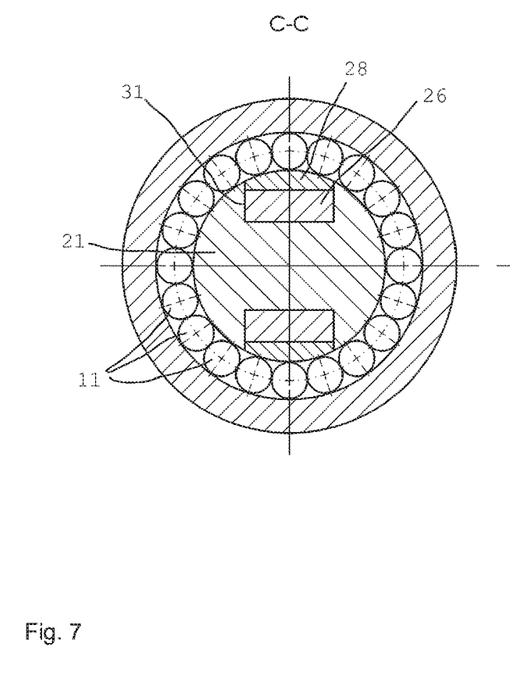
FIG. 7 illustrates a horizontal section C-C through the magnetorheological braking device at a mean height.

FIG. 7 illustrates a horizontal section at a mean height of the magnetorheological braking device 1, wherein the axial grooves 31 are apparent in which the windings of the electrical coil 26 are wound. The groove is filled with casting compound 28 in order to seal and to close said groove with the result that overall a cylindrical embodiment of the first brake component 2 is provided.

Figure 8:
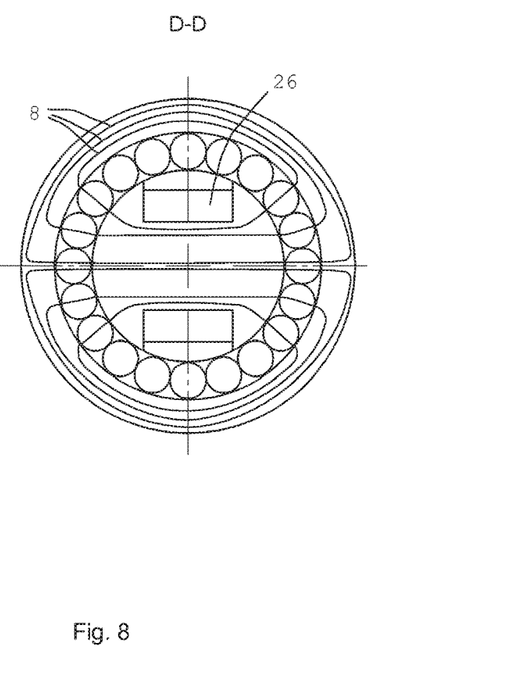
FIG. 8 illustrates a horizontal section D-D similar to FIG. 7 having marked magnetic field lines.

FIG. 8 illustrates in principle the same illustration as FIG. 7 except the hatching has been removed for improved clarity and for this purpose magnetic field lines of the magnetic field 8 are marked. The magnetic field extends transversely with respect to the longitudinal direction through the core 21 and enters in this case approximately horizontally at the two ends out of the core 21 through the roller bodies 11 and then enters into the sleeve part 13. The magnetic field lines close themselves as illustrated in FIG. 8. In this case, multiple roller bodies are exposed to a magnetic field with the result that the chocking effect occurs respectively at multiple—however not all—roller bodies. The roller bodies in the region of the casting compound are essentially free from the magnetic field.

Figure 9:
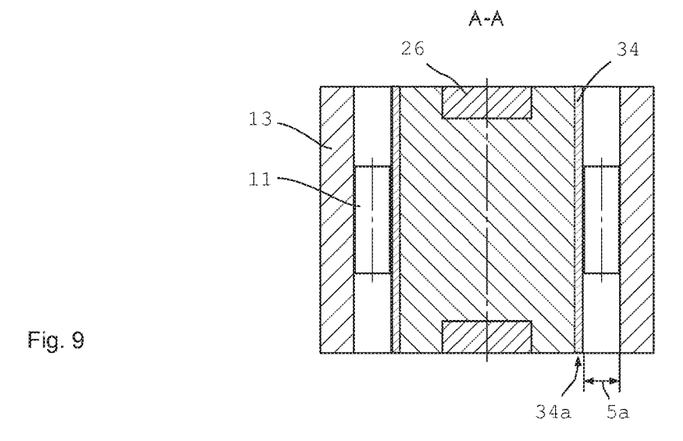
FIG. 9 illustrates the section A-A according to FIG. 5.

FIG. 9 illustrates the cross-section A-A in FIG. 5, wherein the core 21 having the coil 26 is apparent in the central region. FIG. 9 illustrates with the dotted line a variant in which the first brake component 2 is surrounded by a sleeve body 34. The sleeve body 34 comprises a radial thickness 34a that is considerably smaller than the gap width 5a or than a diameter 11a of the roller bodies 11. The sleeve body 34 is embodied from a magnetically conductive material. As a consequence, after a magnetic field is applied a (particularly small) part of the magnetic field is directly short-circuited. Since the wall thickness of the sleeve body 34 is selected as particularly thin and in this case is not illustrated to scale, this (small) magnetic short-circuit is not negatively significant. Conversely, it is advantageous that as a consequence a metallic surface may be provided on the entire periphery of the first brake component 2, as a result of which it is possible to avoid any abrasion that may occur in the region of the casting compound. Where applicable, the use of a sleeve body 34 of this type may also lead to omitting the complete filling procedure with a casting compound 28, which also reduces the outlay during the production process. A cover is then placed on the axial ends of the coil so that the interior is sealed in order to prevent the penetration of MRF.

Figure 10:
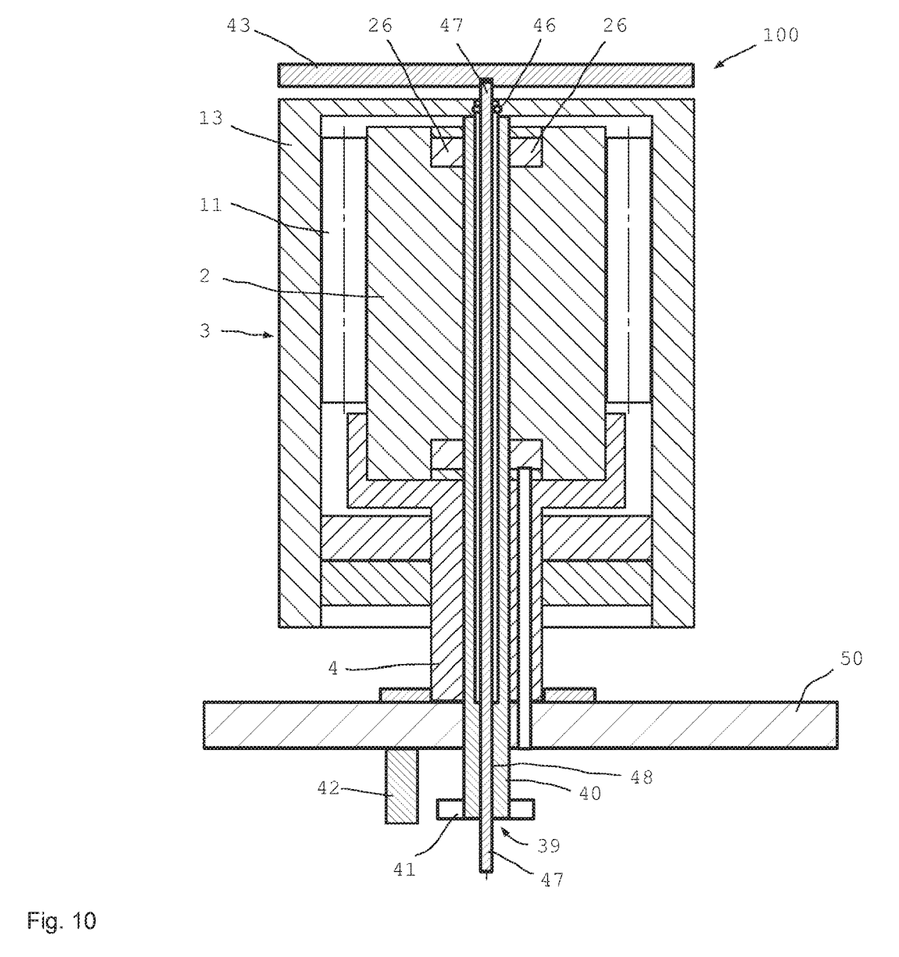
FIG. 10 illustrates a vertical section through a further exemplary embodiment of a magnetorheological braking device in accordance with the invention.

Finally, FIG. 10 illustrates a further exemplary embodiment of a magnetorheological braking device 1 that is likewise embodied in this case as a haptic operating knob 100. The magnetorheological braking device 1 in accordance with FIG. 10 essentially functions in the same manner as in the above-described exemplary embodiments. One difference with respect to the above-described exemplary embodiments is that a central feed-through 39 is provided, through which a supporting element 47 is fed through inclusive (of at least) one supply line. At least one sealing ring 46 may be provided for sealing purposes. The supporting element 47 may be anchored by way of example on the console or the like and supports a user interface 43 on which for example a (touch sensitive) display or an input element is provided.

A further difference is that a shaft 40 is provided that is embodied in this case as hollow. The shaft 40 is connected in a rotatably-fixed manner to the second brake component 3 with the result that in the case of a rotation of the second brake component 3, the shaft 40 (that is embodied as hollow) also rotates. The part 41 of an angle sensor, which is connected in a rotatably-fixed manner to said shaft, also rotates with the rotation of the shaft 40. For example it is possible for the part 41 to be embodied as a magnetic encoder or the like. The part 41 cooperates with the part 42 of an angle sensor, which may be embodied by way of example as a detector. As a consequence, in the case of a rotation of the second brake component 3 a signal is detected by means of the sensor 41, 42. In this case, a relative or also an absolute angle signal may be detected. One considerable advantage of such an embodiment having a shaft 40 resides in the fact that the angle sensor is received in a protected manner within the console. As a consequence, contamination does not reach the sensor from the outside, with the result that a reliable operation may be ensured. Where applicable, it is also possible to arrange the parts 41 and 42 in the interior of the holder 4.

In the event of only one angle sensor 41, 42 being provided, it is not necessary for the shaft 40 to be embodied as hollow and to be used to feed-through a supporting element 47 for a display/input element. The shaft 40 may also be embodied as solid. A display must then either be fastened and supplied in another manner or said display must be omitted.

The user interface 43 may also be used as a pressure element or tension element, which transmits via the supporting element 47 the movement to an encoder/switch that lies below (possibly under the console 50).

It is also possible to move (push/pull) the entire braking unit relative to the console 50 in the axial direction as well as in the radial direction, as well as to move the entire unit with or without a console in the radial or axial direction.

Conversely, it is also possible to provide a feed-through without the hollow shaft. By way of example if the protected attachment of an angle sensor is omitted or an angle position is detected in another manner.

Figure 11A:
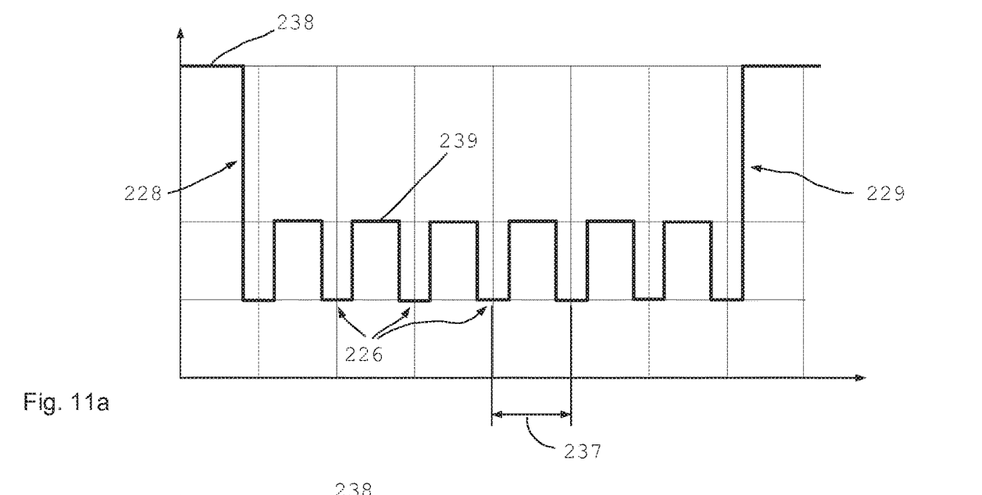
FIGS. 11A-11C illustrate possible torque curves over the angle of rotation of a magnetorheological braking device in accordance with the invention.
Figure 11B:
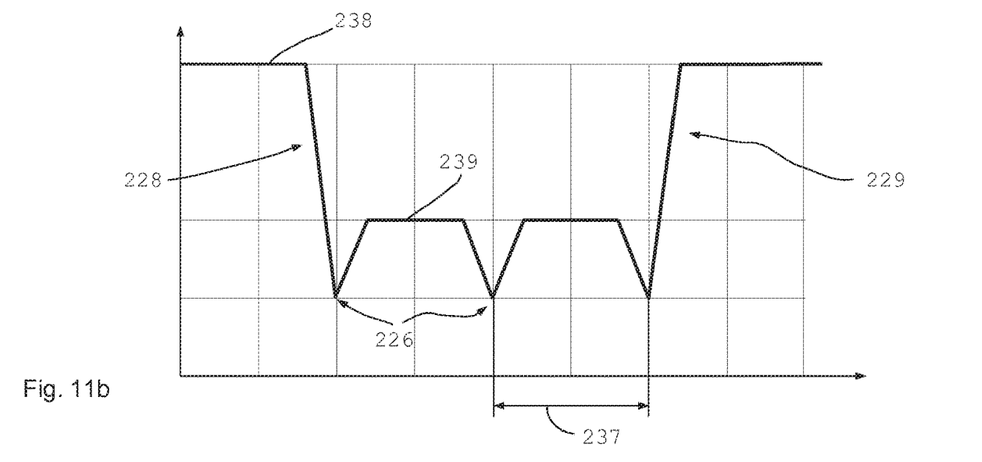
Figure 11C:
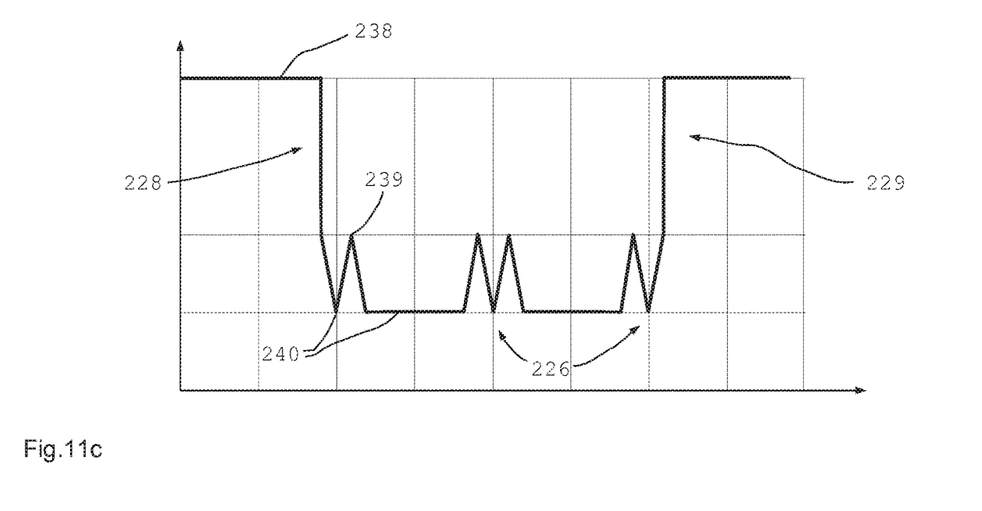

Possible embodiments for controlling a dynamically generated magnetic field or a dynamically generated braking torque in dependence upon the angle of rotation are illustrated in the FIGS. 11a, 11b and 11c.

FIG. 11a illustrates in this case a variant in which a rotary knob is used as a haptic operating aid. The rotational resistance is illustrated over the angle of rotation. A left-hand side end stop 228 and a right-hand side end stop 229 may be generated using the controller 27. A high magnetic field or stopping torque 238 is generated at the rotary knob when the rotary knob 23 is further rotated, as a result of which the rotary knob 23 sets a high resistance with respect to a rotational movement. The user obtains the haptic feedback of an end stop.

In this case, a magnetic selection of the rotational movement may be provided or generated. By way of example, this may be used in order to navigate through a graphic menu and to select menu points. In this case, a first magnetic selection point 226 is provided directly adjacent to the left-hand side end stop 228, said magnetic selection point corresponding to for example a first menu point during operation. If the next menu point is to be selected, the rotary knob 100 is rotated clockwise. For this purpose, the dynamically generated higher magnetic field or selection torque 239 or the frictional torque thereof must be overcome prior to reaching the next magnetic selection point 226. In FIG. 11a, a respective constant magnetic field is generated for a specific angular range respectively at the magnetic selection points 226 and at the regions that lie between said magnetic selection points, said magnetic field being considerably smaller at the magnetic selection points than in the regions in between said magnetic selection points and again clearly less than at the stops 228, 229.

An angular distance 237 between individual magnetic selection points may be changed dynamically and is adapted to the number of magnetic selection points or menu points that are available.

FIG. 11b illustrates a variant in which at the end stops 228, 229 the magnetic field does not increase abruptly but rather assumes a steep curve. Furthermore, respective ramp-like increases of the magnetic field are provided at the magnetic selection points 226 on both rotational sides, as a result of which the rotational resistance increases in the corresponding rotational directions. In this case, using the same operating device 100 only three magnetic selection points 226 are provided and the angular distance 237 thereof is greater than in the example in accordance with FIG. 11a.

FIG. 11c illustrates a variant in which a lower rotational resistance is provided between individual magnetic selection points 226 and an increased magnetic field 239 is only generated directly adjacent to the magnetic selection points 226 respectively in order to render it possible to snap into the individual magnetic selection points 226 and simultaneously to only provide little rotational resistance between individual magnetic selection points.

Fundamentally, a mixture of the operating modes and the magnetic field curves of the FIGS. 11a, 11b, 11c is also possible. For example, in the case of different submenus an accordingly different setting of the magnetic field curve may be provided.

It is also possible in all cases that, in the event of for example a ripple (selection), a switch is performed unlike as previous between less and more current strength having the same polarity (in other words for example +0.2 to +0.8 A=ripple), but rather alternately with a changed polarity, in other words from +0.2 to +0.8 A and then the next ripple from −0.2 A to −0.8 A and then the next torque peak from +0.2 to +0.8 etc.

It is also possible in all cases that the operating mode of the FIGS. 11a, 11b and 11c or a mixture of the operating modes are selected by means of voice commands. The user selects a function (volume, transmitter selection . . . ) by voice input (using local or remote voice recognition, for example via Alexa, Amazon Echo, Siri, Google voice input . . . ). The magnetorheological braking device then provides a corresponding operating mode (volume=selection having an increasing braking torque for increasing volume; radio transmitter selection=selection having various increment and therebetween low braking torque until a transmitter is found).

The preferably low-alloy steel may contain a residual magnetic field. The steel is preferably demagnetized regularly or as required (inter alia by means of a specific alternating field).

It is preferred that the material FeSi3P (silicon steel) or a related material is used for the components that the magnetic field flows through.

In all cases, a voice control procedure or a sound control procedure may be performed. The braking device may be controlled adaptively using voice control.

If the rotary unit is not rotated, in other words the angle is constant, the current is preferably continuously reduced over the time. The current may also be varied in dependence upon speed (rotational angle speed of the rotary unit).

LIST OF REFERENCE NUMERALS

| | |
|---|---|
| 1 | Magneto rheological braking device |
| 2 | Brake component |
| 2a | Outer diameter |
| 3 | Brake component |
| 4 | Holder |
| 5 | Gap, duct |
| 5a | Gap width |
| 5b | Gap length, gap height |
| 6 | Medium |
| 8 | Field |
| 9 | Free gap |
| 10 | Acute angled region |
| 11 | Transmission component, roller body, rotary body |
| 11a | Diameter of 11 |
| 11b | Length of 11 |
| 11c | Magnetically non-conductive transmission component |
| 12 | Rotational axis |
| 13 | Sleeve part |
| 13a | Inner diameter |
| 13b | Outer diameter |
| 13c | Height |
| 13d | Wall thickness |
| 14 | Sphere |

-continued

| | |
|---|---|
| 15 | Cylinder |
| 16 | Chock shape |
| 17 | Direction of the relative movement |
| 18 | Direction of the relative movement |
| 19 | Magnetic particles |
| 20 | Axial direction |
| 21 | Core |
| 22 | Sphere for the bearing arrangement of 3 |
| 23 | Rotary knob |
| 24 | Outer ring |
| 26 | Coil |
| 27 | Control device |
| 28 | Casting compound |
| 30 | Bearing arrangement |
| 31 | Axial groove |
| 32 | Transverse groove |
| 33 | Cylindrical base body |
| 34 | Sleeve body |
| 34a | Radial thickness of 34 |
| 35 | Cable feed-through |
| 36 | Receiving arrangement |
| 36a | Outer diameter |
| 37 | Cylindrical running surface |
| 37a | Outer diameter |
| 38 | Seal |
| 39 | Feed-through |
| 40 | Shaft |
| 41 | Part of an angle sensor |
| 42 | Part of an angle sensor |
| 43 | User interface |
| 45 | Cable |
| 46 | Sealing ring |
| 47 | Supporting element and supply line |
| 48 | Sliding guide |
| 49 | Cover |
| 50 | Console |
| 100 | Haptic operating knob |
| 226 | Magnetic selection point |
| 228 | End stop |
| 229 | End stop |
| 237 | Angular distance |
| 238 | Stop torque |
| 239 | Selection torque |
| 240 | Base torque |

The invention claimed is:

1. A magnetorheological braking device, comprising:
a fixed holder;
at least two brake components, including a first brake component connected in a rotationally-fixed manner to said holder and extending in an axial direction, and a second brake component having a hollow sleeve part rotatably mounted about said first brake component;
at least one rotatable transmission component disposed in a gap formed between said first and second brake components;
a magnetorheological medium at least partially filling said gap;
said first brake component having a core extending in the axial direction and formed of a magnetically conductive material, and an electrical coil wound axially around said core;
said hollow sleeve part being formed of a magnetically conductive material and providing an outer ring for a magnetic field of said electrical coil; and
wherein said magnetic field of said electrical coil extends transversely with respect to the axial direction through said core and enters through said at least one rotatable transmission component on opposite sides of the gap into said sleeve part, wherein the magnetic field closes itself in opposing halves of the sleeve part.

2. The magnetorheological braking device according to claim 1, wherein said at least one rotatable transmission component is a roller body.

3. The magnetorheological braking device according to claim 2, wherein said roller body has a cross-sectional shape selected from the group consisting of cylindrical, spherical, round, and rounded.

4. The magnetorheological braking device according to claim 1, wherein at least some of said transmission components are formed of a magnetically conductive material and at least some of said transmission components are formed of a magnetically non-conductive material.

5. The magnetorheological braking device according to claim 1, wherein said sleeve part is a rotary knob.

6. The magnetorheological braking device according to claim 1, wherein said sleeve part is formed of a magnetically conductive material and defines an outer ring for the magnetic field.

7. The magnetorheological braking device according to claim 6, wherein a radial wall thickness of said sleeve part is at least half as thick as a gap width of said gap and/or as a diameter of said at least one rotatable transmission component.

8. The magnetorheological braking device according to claim 1, wherein a length of said first brake component in the axial direction is greater than a length of said at least one rotatable transmission component in the axial direction.

9. The magnetorheological braking device according to claim 1, wherein a length of said gap in the axial direction is at least twice as large as a length of said at least one rotatable transmission component in the axial direction.

10. The magnetorheological braking device according to claim 1, wherein said first brake component is substantially cylindrical and comprises said electrical coil and a cylindrical base body, forming said core.

11. The magnetorheological braking device according to claim 10, wherein said electrical coil is wound in grooves formed in said cylindrical base body, said grooves being axial grooves and/or transverse grooves.

12. The magnetorheological braking device according to claim 1, further comprising a sleeve body surrounding said cylindrical base body and fixedly connected to said cylindrical base body, and wherein a radial thickness of said sleeve body is smaller than half of a radial gap width of said gap.

13. The magnetorheological braking device according to claim 1, wherein said holder comprises a receiving arrangement for a rotatably-fixed connection to said first brake component and wherein said holder comprises a cylindrical running surface for a bearing arrangement and supports said sleeve part rotatably on said holder.

14. The magnetorheological braking device according to claim 13, further comprising a seal arranged on said cylindrical running surface for sealing said gap, said seal being arranged closer to said gap than said bearing arrangement.

15. The magnetorheological braking device according to claim 1, wherein said first brake component is formed with a feed-through for a shaft that is connected rotatably fixed to said second brake component.

16. The magnetorheological braking device according to claim 15, further comprising an angle sensor, said angle sensor having a first part mounted to said shaft and a second part mounted to said holder or to a console.

17. The magnetorheological braking device according to claim 1, further comprising a device selected from the group consisting of a user interface, an operator panel, a display, a touch-sensitive display with or without haptic feedback, and at least one sensor attached to an axial end lying opposite from said holder.

18. The magnetorheological braking device according to claim 1, further comprising at least one device selected from the group consisting of a microphone, a sound recognition device, and a voice recognition device.

\* \* \* \* \*